Figure 1:
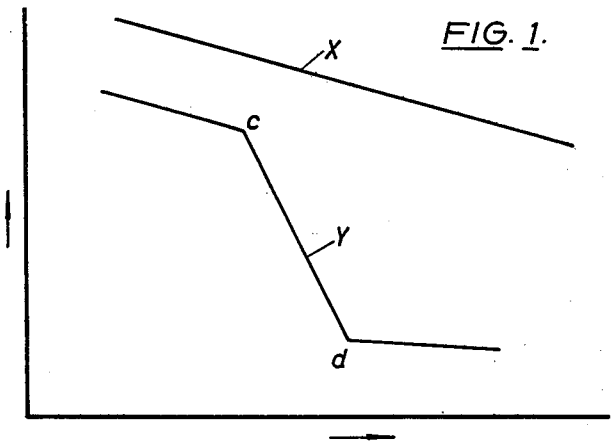

Nov. 21, 1961 F. H. BURKITT 3,009,832
FORMATION OF ALDEHYDE CONDENSATION PRODUCTS
Original Filed April 30, 1956 8 Sheets-Sheet 1

Inventor
FRANK HARRY BURKITT

By
Attorneys

Nov. 21, 1961  F. H. BURKITT  3,009,832
FORMATION OF ALDEHYDE CONDENSATION PRODUCTS
Original Filed April 30, 1956  8 Sheets-Sheet 2

Inventor
FRANK HARRY BURKITT

By
Attorneys

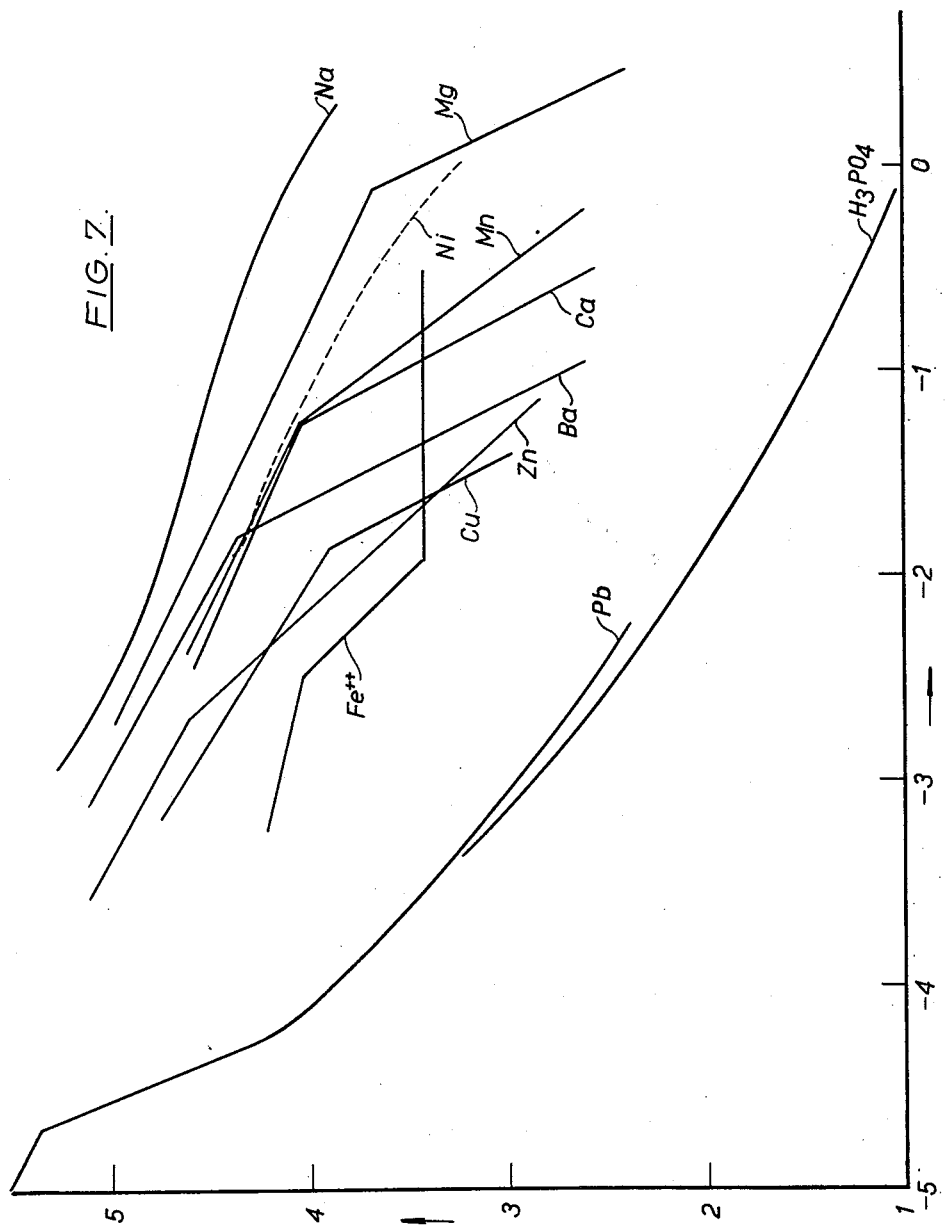

Inventor
FRANK HARRY BURKITT

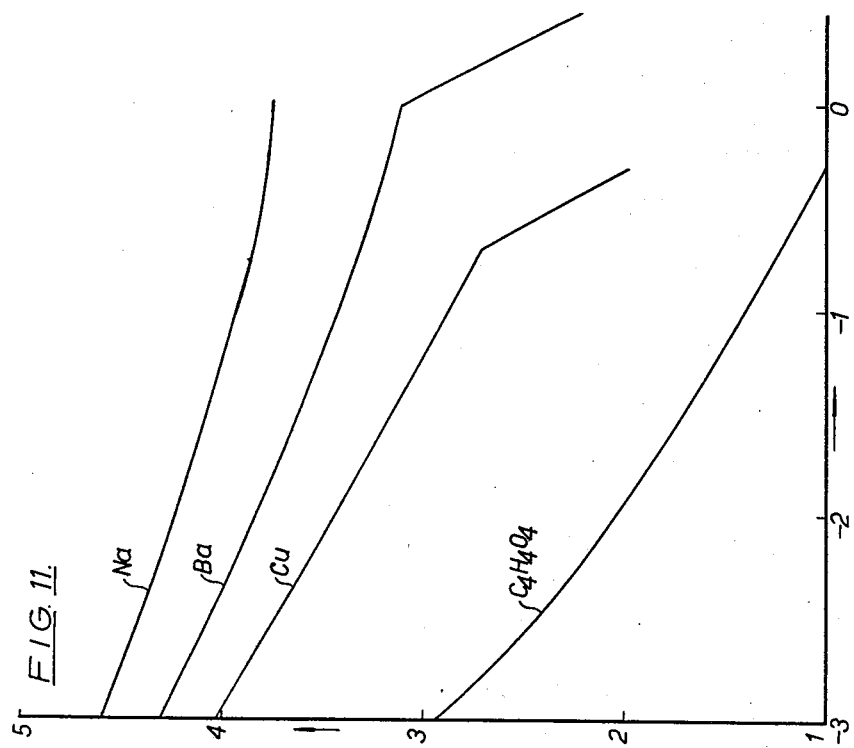
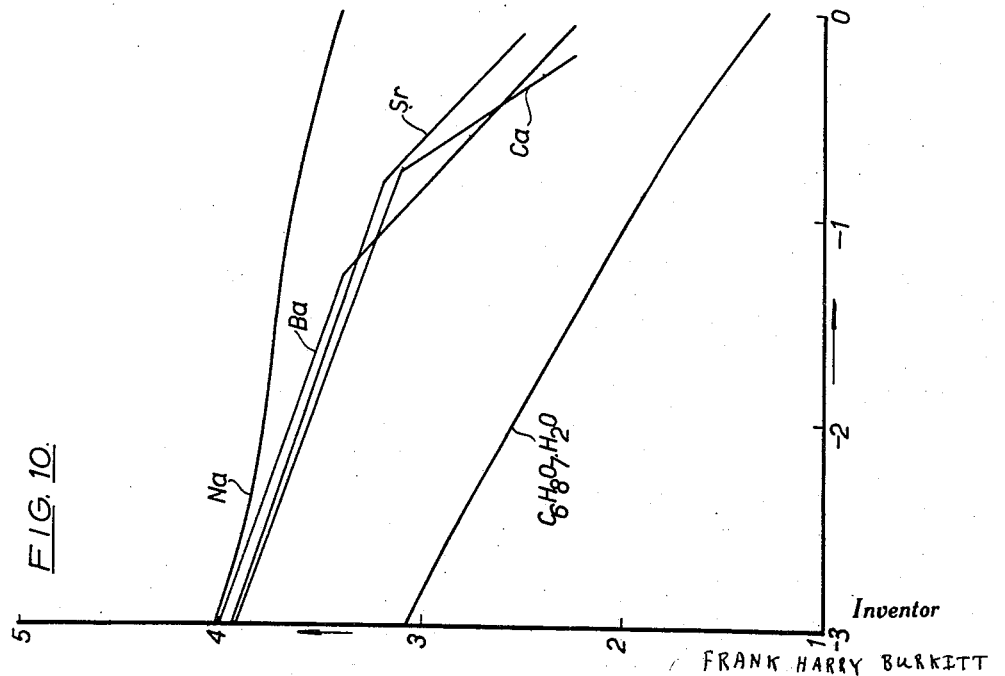

Nov. 21, 1961  F. H. BURKITT  3,009,832
FORMATION OF ALDEHYDE CONDENSATION PRODUCTS
Original Filed April 30, 1956  8 Sheets-Sheet 8

Inventor
FRANK HARRY BURKITT
By
Mead Browne Schuyler & Beveridge
Attorneys

3,009,832
FORMATION OF ALDEHYDE CONDENSATION PRODUCTS

Frank Harry Burkitt, Manchester, England, assignor to Tootal Broadhurst Lee Company Limited, Lancashire, England
Original application Apr. 30, 1956, Ser. No. 581,508. Divided and this application Mar. 13, 1958, Ser. No. 721,160
Claims priority, application Great Britain Feb. 11, 1956
20 Claims. (Cl. 117—161)

This invention relates to improvements in the formation of aldehyde condensation products and in the catalysis thereof.

The condensation of many compounds, especially amino compounds, with aldehydes can be catalysed by acids. It is not, however, convenient in many cases to add free acid to solutions containing the ingredients of aldehyde condensation products. For example, mixtures of the ingredients of amino-aldehyde condensation products and free acid are unstable and can undergo premature condensation. (The term "ingredients" when used herein includes partial condensates, i.e. the so-called intermediate condensation products.) Such acid catalysts generally have to be added at the last moment before the acid-catalysed condensation is required to take place and such condensation is customarily effected by heating. It is, therefore, more convenient to have a solution of the ingredients of an aldehyde condensation product, especially an amino-aldehyde condensation product, containing a substance which does not catalyse the condensation to any substantial extent at ordinary temperatures, but does catalyse it when the solution is heated. Accordingly, in the formation of condensation products from amino compounds and formaldehyde e.g. urea and formaldehyde or melamine and formaldehyde, it is customary to add to an aqueous solution of the resin-forming ingredients, an ammonium salt of a strong acid such as ammonium chloride or an ammonium phosphate. Such a solution has a fairly high pH at ordinary temperatures so that the condensation does not proceed at all or proceeds only slowly, but on heating the pH falls, due to a chemical reaction between the ammonium ion of the ammonium salt of the strong acid and the formaldehyde or the intermediate condensation product causing the strong acid to be liberated, so that the condensation is catalysed and proceeds more rapidly. However, there are certain disadvantages, which will be referred to later, attending the use of ammonium salts because of the chemical reaction referred to above.

One object of the invention is to overcome these disadvantages. Another object is to provide a solution containing the ingredients of an aldehyde condensation product in which the acidity required for the further condensation of said ingredients can be developed without chemical reaction between any of said ingredients and any added substance. Another object is to provide a solution containing the ingredients of an amino aldehyde condensation product in which the acidity required for further condensation of said ingredients can be developed without the presence in said solution of any ammonium salt. Another object is to provide a solution containing the ingredients of an aldehyde condensation product in which the acidity required for further condensation of said ingredients can be developed by mere removal of solvent therefrom. A further object is to provide a solution containing the ingredients of an aldehyde condensation product which, on evaporation, will undergo a sudden and substantial increase in acidity when almost all the solvent has been removed. A still further object is to provide an aqueous solution, particularly useful for treating textile materials, of a crystalloidal intermediate condensation product of urea and formaldehyde or melamine and formaldehyde which is stable at room temperatures but will develop sufficient acidity to catalyse the formation of resin from said condensation product on evaporation and/or heating, especially such a solution containing little or no ammonium salt. Another object of the invention is to provide a solution containing the ingredients of an aldehyde resin in which the acidity developed is unaffected by traces of alkali in the solution. These and other advantages can be secured by making use of a little known property of certain acid salts, of which magnesium dihydrogen phosphate is a convenient example. The term "phosphoric acid" is used herein to mean orthophosphoric acid and the term "phosphate" to mean orthophosphate.

When an aqueous solution of sodium dihydrogen phosphate is concentrated by evaporation at room temperature, the salt which first separates out is sodium dihydrogen phosphate. By the term "room temperature" when used herein, we mean substantially 20° C. On the other hand, when an aqueous solution of magnesium dihydrogen phosphate is concentrated by evaporation at room temperature, the salt which first separates out is magnesium monohydrogen phosphate. During the removal of solvent by evaporation, the pH of both these solutions falls; but in the case of the solution of magnesium dihydrogen phosphate, the effect of the separation of magnesium monohydrogen phosphate is that the rate of increase of acidity with increase in the proportion of magnesium in solution becomes greater after the point is reached at which the separation begins.

Moreover, when an aqueous solution of magnesium dihydrogen phosphate is merely heated, magnesium monohydrogen phosphate may separate from the solution at about 70° C., this separation being accompanied by a sudden increase in acidity. This appears to be due to the fact that at that temperature a hydrate of magnesium monohydrogen phosphate is formed which is less soluble at that temperature than either magnesium dihydrogen phosphate or the form of magnesium monohydrogen phosphate stable below that temperature. Such hydrate will, accordingly, separate on heating the solution to the above transition temperature even without evaporation of the solution, provided that the initial concentration of the magnesium dihydrogen phosphate is sufficiently high. At concentrations above 10 grams per litre, such separation will take place from simple aqueous solution on mere heating to the above transition temperature.

The first effect can be brought about in any ionising solvent for the metal dihydrogen phosphate from which a less acid salt first separates out on evaporation. Thus, an ethanol solution of sodium dihydrogen phosphate exhibits the first effect. The second effect can also be brought about in any ionizing solvent capable of forming with magnesium monohydrogen phosphate a complex or crystal form which will separate from the solution on mere heating, as does the hydrate when water is used as the ionizing solvent. These effects, or at least the first one, can also be realised with acid salts of polybasic acids, other than magnesium dihydrogen phosphate. Solutions of acid salts from which a less acid salt will separate before such acid salt on removal of solvent and/or on heating can be obtained from polybasic acids other than phosphoric acid, for example phosphorous acid, pyrophosphoric acid, malonic acid, malic acid, maleic acid, tartaric acid and succinic acid.

Examples of acid salts whose solutions can be used are:

Calcium dihydrogen phosphate
Strontium dihydrogen phosphate
Nickel dihydrogen phosphate
Lithium dihydrogen phosphate
Lithium monohydrogen phosphate
Calcium hydrogen phosphite
Magnesium dihydrogen pyrophosphate
Calcium hydrogen malonate
Strontium hydrogen malonate
Calcium hydrogen malate
Calcium hydrogen maleate
Barium hydrogen maleate
Strontium hydrogen tartrate
Calcium hydrogen succinate It is simply necessary that the acid salt be that of a metal of which a less acid salt with the same polylbasic acid is precipitated before said acid salt on mere removal of solvent from and/or on heating of the solution. Such metal will hereinafter be referred to as a "selected metal."

By the term "acid salt" is meant a salt in which less than all of the replaceable hydrogen atoms in the polybasic acid molecule are replaced by the selected metal and the other replaceable hydrogen atom or atoms is or are unreplaced.

By the term "less acid salt" is meant a salt in which more of the replaceable hydrogen atoms in the polybasic acid molecules are replaced by the selected metal than in the case of said acid salt; the term includes salts in which all of the replaceable hydrogen atoms are so replaced.

These effects are reversible. This means that if such solutions, after being concentrated by evaporation (or heated) are again diluted (or cooled as the case may be) the separated salt is re-dissolved and the pH rises again. These effects can be readily demonstrated by the following experiments with magnesium dihydrogen phosphate.

(A) PRECIPITATION AND DEVELOPMENT OF ACIDITY BY EVAPORATION WITHOUT HEATING

A quantity of pure crystalline magnesium dihydrogen phosphate dihydrate, $Mg(H_2PO_4)_2 \cdot 2H_2O$, was dissolved in an equal weight of water. After three days standing in the air so that evaporation took place at room temperature, it was found that crystals had deposited. These were filtered off and identified spectroscopically as magnesium monohydrogen phosphate.

A sample of the original solution was diluted ten times with water and was found to have a pH of 3.6. A sample of the filtrate taken after precipitation had occurred and similarly diluted ten times with water was found to have a pH of 3.0.

(B) PRECIPITATION AND DEVELOPMENT OF ACIDITY BY HEATING WITHOUT EVAPORATION

A 10% solution of pure crystalline magnesium dihydrogen phosphate dihydrate was made and was found to be stable indefinitely at room temperatures: its pH was 3.6. This solution was then warmed at the rate of 10° C. per hour and at 69° C. a slight powdery precipitate began to separate. On refluxing for 30 minutes this solution deposited a further quantity of crystals which were filtered off and identified spectroscopically as magnesium monohydrogen phosphate. The pH of the filtrate was 2.8.

(C) PRECIPITATION AND DEVELOPMENT OF ACIDITY BY EVAPORATION AND REVERSAL OF THE EFFECT

An N/10 solution of magnesium dihydrogen phosphate was taken and found to be alkaline to bromophenol blue. A quantity of this was evaporated to dryness and water was then added to restore the volume to its original level. The solid did not all re-dissolve but the mixture was now strongly acid to bromophenol blue. On shaking, the mixture became more alkaline, and the solid gradually re-dissolved when the mixture was allowed to stand at room temperature over the course of a few days, the mixture returning to its original colour.

(D) PRECIPITATION AND DEVELOPMENT OF ACIDITY BY REMOVAL OF SOLVENT WITHOUT EVAPORATION

To an N/10 solution of magnesium dihydrogen phosphate, ethyl alcohol was added. There was instant precipitation of a solid and the solution became acid to bromophenol blue.

In the present invention, advantage is taken of either or both of these effects, i.e. development of acidity by removal of solvent and by heating, to bring about the acid catalysis of the condensation of amino compounds with aldehyde.

These effects can be brought about in solutions containing the ingredients of aldehyde condensation products. It thus becomes possible to make solutions, in ionizing solvents such as water or methanol, containing the ingredients of such condensation products, which solutions have a sufficiently high pH to enable them to be kept for long periods without any substantial condensation taking place but which, on removal of solvent and/or on heating, will show a rapid fall in pH after a critical concentration and/or temperature has been reached, thereby enabling the acid-catalysed condensation to take place. In order that such condensation be effectively acid-catalysed, it is necessary that the polybasic acid be one having a first dissociation constant in water of not less than $10^{-6}$.

The critical concentration referred to above is the concentration at which the solution becomes saturated with respect to the less acid salt which separates out before the acid salt. The critical concentration depends upon the nature of the selected metal, upon the nature of the polybasic acid and upon the ionizing solvent employed and may be altered by other ingredients in the solution, especially any common ions. However, it is generally possible to determine the critical concentration for any solution by making pH measurements at various concentrations and at the temperature at which it is desired to use the system and drawing a graph showing the relationship between pH and concentration. The slope of the curve alters suddenly at the point where the less acid salt of the selected metal begins to separate out. Several such graphs are described hereinafter. The word "concentration" refers to the concentration of the selected metal in solution.

The critical temperature, when it exists, is a transition temperature between two phases and is therefore independent of the other ingredients in the solution.

If supersaturation occurs, separation of the less acid salt of the selected metal may not take place immediately the critical concentration and/or temperature is reached. This, however, is no disadvantage for most purposes. The separation of the less acid salt will merely be delayed and when it does take place there will be a sudden fall in pH.

According to the present invention there is provided a solution in an ionizing solvent of the ingredients of an aldehyde condensation product whose formation is catalysed by acid, containing in solution an acid salt of a polybasic acid having a first dissociation constant in water of not less than $10^{-6}$, with a metal of which a less acid salt with the same polybasic acid is precipitated before said acid salt on removal of solvent from and/or on heating of the solution. Preferably the solution contains a dihydrogen phosphate of a metal whose trimetal phosphate or monohydrogen phosphate will separate before its dihydrogen phosphate on removal of solvent and/or on heating of the solution.

A very convenient way of producing such a solution containing the dihydrogen phosphate of such a metal is to introduce into the solution of the ingredients of the aminoaldehyde condensation product the dihydrogen phosphate of a base whose dihydrogen phosphate will separate from solution on removal of solvent and/or on heating before its monohydrogen phosphate, such as an alkali metal or ammonium dihydrogen phosphate, and also a salt of the selected metal, such as magnesium, with an acid which is stronger than phosphoric acid. It is, of course, desirable that neither the salt of the selected metal with such acid stronger than phosphoric acid nor the dihydrogen phosphate of the base should separate first from the solution on removal of solvent and/or on heating, at the temperature to which the solution is subjected. A solution containing an acid salt of a selected metal with a polybasic acid, other than phosphoric acid, having a first dissociation constant in water of not less than $10^{-6}$ can be produced in analogous manner.

Accordingly, the invention includes a solution in an ionizing solvent of the ingredients of an aldehyde resin whose formation is catalysed by acids containing in solution an acid salt, especially an alkali metal or ammonium acid salt, of a polybasic acid having a first dissociation constant in water of not less than $10^{-6}$ (such as the dihydrogen phosphate) and also a salt with an acid stronger than said polybasic acid of a metal of which a less acid salt with said polybasic acid (such as its trimetal phosphate or monohydrogen phosphate) will separate before the acid salt of said metal from the solution on removal of solvent therefrom and/or on heating thereof.

The acid salt may be, for example, a sodium or potassium salt of phosphoric acid. The selected metal for use with salts of phosphoric acid may be, for example, lithium, barium, calcium, strontium, magnesium, zinc, copper, iron (ferrous), manganese, cadmium or cobalt. Ferrous salts are not suitable for use with salts of phosphoric acid if a pH below about 3.5 is required.

The acid stronger than the said polybasic acid may be, for example, hydrochloric acid or sulphuric acid or nitric acid provided that the resulting solution does not unduly attack the ingredients of the aldehyde resin or the material which is to be treated with the solution.

It is preferred to use acid salts of a metal such as an alkali metal, most suitably acid salts of sodium; the acid salts of ammonium are preferably not used since they can give rise to some reaction with the aldehyde or intermediate condensation product in the solution.

A solution as defined above comprises a system of salts which behaves, as regards pH change beyond the critical concentration and/or beyond the critical temperature, as if it were simply a solution of the acid salt of the selected metal. However, the system must be such that the pH at the critical concentration is sufficiently high, or can be made sufficiently high by buffering as hereinafter explained, to prevent premature condensation of the aldehyde resin-forming ingredients.

A few systems which have been found useful are:
(a) Sodium dihydrogen phosphate and magnesium chloride
(b) Sodium dihydrogen phosphate and magnesium sulphate
(c) Sodium dihydrogen phosphate and calcium chloride
(d) Sodium hydrogen malonate and strontium chloride
(e) Sodium hydrogen maleate and barium chloride
(f) Sodium dihydrogen phosphate and lithium chloride
(g) Sodium dihydrogen phosphate and nickel sulphate
(h) Sodium dihydrogen phosphate and strontium chloride
(i) Disodium hydrogen phosphate and lithium chloride
(j) Potassium hydrogen phosphite and calcium chloride
(k) Disodium dihydrogen pyrophosphate and magnesium sulphate
(l) Sodium hydrogen maleate and calcium chloride
(m) Sodium hydrogen malonate and calcium chloride
(n) Sodium hydrogen succinate and calcium chloride
(o) Sodium hydrogen tartrate and strontium chloride
(p) Sodium hydrogen malate and calcium chloride The acid salt of said polybasic acid and the salt of a selected metal with an acid stronger than said polybasic acid are preferably used in substantially equivalent proportions, although an excess of one or the other up to about 3 to 1 equivalents does not give rise to any inconvenience. It is desirable, however, to employ such relative proportions that neither salt will separate from solution before the desired separation of less acid salt takes place, since the salt which so separates serves no useful purpose.

At concentrations below the critical concentration and/or at temperatures below the critical temperature the solutions containing the ingredients of an amino-aldehyde condensation product are quite stable, due to their pH value. By "stable" is meant that the ingredients of the amino-aldehyde resin in the solution will not readily condense to water-insoluble condensation products on standing. Solutions containing the ingredients of urea-formaldehyde resin having a urea to formaldehyde ratio of 1:1.6 and a solids content of 20% weight/volume are stable at 20° C. for a period of not less than about one hour when the pH remains at 4, of not less than about 8 hours when the pH remains at 5, and of not less than about 24 hours when the pH remains at 5.5. It is therefore desirable that the pH value of the solutions should initially be not less than 5. One reason why it is preferable to use an acid salt of a metal such as an alkali metal rather than an acid salt of ammonium, when a salt of an acid stronger than said polybasic acid is also employed, is that the pH of the solutions containing salts of metals such as alkali metals remains unchanged on mere standing, whereas the pH of solutions containing ammonium salts falls on mere standing because of the reaction already referred to with the aldehyde or intermediate condensation product which can proceed slowly even without heating; no such reaction takes place when a metal such as an alkali metal salt is employed. It is also desirable to use acid metal salts which are not substantially hydrolysed in solution.

When the critical concentration is comparatively low the concentration of salts which can be held in solution is small, so that the total amount of acid produced in the solution by precipitation of the less acid salt will also be small. If the solution contains traces of alkali, the acid formed may be partially or even wholly neutralised by such alkali. Consequently under these conditions there is a possibility that the final pH produced will not be sufficiently low to catalyse the aldehyde condensation effectively.

If, however, the critical concentration can be raised to a higher value, the amount of salts held in solution will be raised so that the total amount of acid produced will also be increased. By so raising the critical concentration, the total amount of acid formed could thus be raised to a point where the traces of alkali present would no longer substantially affect the final pH achieved. I have further found that this raising of the critical concentration can be achieved if a complexing agent capable of forming a soluble complex with the selected metal ions is incorporated in the solution.

Although the aforementioned complexing agent can also be called a chelating agent, the term complexing agent will be employed hereinafter in describing the present invention.

The complexing agent must be one which forms complexes with the selected metal which are stable at high pH values but which progressively decompose when the pH is lowered. Examples of such complexing agents are ethylene diamine tetra acetic acid, nitrilo triacetic acid, cyclohexylene diamine tetra acetic acid and the alkali metal salts of these acids. Thus when the selected metal is calcium, the complexing agent may be ethylene diamine tetraacetic acid (EDTA) or an alkali metal salt thereof.

Examples of systems of this sort are:
(a) Sodium dihydrogen phosphate, calcium chloride and the disodium salt of ethylenediamine tetraacetic acid
(b) Disodium dihydrogen pyrophosphate, magnesium sulphate and the disodium salt of ethylene diamine tetraacetic acid
(c) Sodium hydrogenmaleate, barium chloride and the disodium salt of ethylene diamine tetraacetic acid
(d) Sodium hydrogen tartrate, strontium chloride and the disodium salt of ethylene diamine tetraacetic acid.

If the initial pH of the solution is too low for it to have whatever stability may be desired, the pH can be raised by buffering. Such buffering is brought about by the addition to the solution of a substance which will increase the concentration of anions of the less acid salt (e.g. monohydrogen phosphate ions) therein, either directly or indirectly. Such direct increase can be brought about by the addition of a soluble salt providing such anions (e.g. a soluble metal monohydrogen phosphate such as an alkali metal monohydrogen phosphate). Indirect increase can be brought about by the addition of a substance which will reduce the hydrogen ion concentration. Examples of such substances are ammonia or organic bases, alkali metal hydroxides and alkali metal salts of acids weaker than said polybasic acid, such as boric acid. Where the polybasic acid is phosphoric acid and the less acid salt of a selected metal which separates is a monohydrogen phosphate, tri-alkali metal phosphates can be used as buffers. There is a limit to the extent to which the initial pH of the solution can be raised by buffering, this limit being determined, for a given concentration of polybasic anion, by the amount of free selected metal ions in solution. The lower the concentration of free selected metal ions, the greater is the amount by which the solution can be buffered. As has already been indicated, the presence of a complexing agent results in the formation of a complex containing some of the selected metal. By adding a complexing agent to the solution, the concentration of the free selected metal ions can be lowered and the limit to which the solution can be buffered therefore raised. When buffering is effected with a salt of an acid weaker than said polybasic acid, or where the complexing agent is an acid or a salt of an acid weaker than the said polybasic acid, the number of equivalents added must not exceed the number of equivalents of hydrogen ion which can be liberated by precipitation of the less acid salt. This will be further explained hereinafter with the aid of the graphs already referred to.

When the solutions contain the ingredients of an amino-aldehyde condensation product the extent to which the solvent must be removed from the solution by evaporation to initiate the separation of the less acid salt of a selected metal will influence the nature of the amino-aldehyde condensation products which are formed. If, on evaporation of such an aqueous solution of the present invention, separation takes place at such a stage that the pH falls low enough to give rise to water-insoluble condensation products at a time when there is still a substantial proportion of water present, the condensation product will be precipitated in particulate form. If, on the contrary, it is possible by evaporation to remove substantially all of the water before the pH falls low enough to give rise to water-insoluble condensation products, then the resulting products will be resinous in character. Even if some of the condensation product is precipitated from solution in particulate form, there will generally also be an appreciable amount produced in resinous form on further concentration.

The solutions of the present invention may be used for the treatment of fibrous materials such as fibres, yarns, fabrics or paper to produce aldehyde condensation products therein and/or thereon. They may also be used for other purposes for which solutions of thermo-hardening aldehyde resins are commonly employed, for example as adhesives or bonding agents or for the preparation of thermo-hardened resin objects or for the preparation of moulding powders. Thus, they may be used for the bonding of glass fibres, for example to form hard bonded glass mats or soft bonded glass blocks. They may also be used for the bonding of fibres of glass, cotton or the like in thin sheets, for example for the manufacture of the so-called glass fibre tissue. In particular, they are useful for making bonded non-woven viscose rayon fabrics. They may also be used for the production of laminated sheets of paper, wood, leather or the like. They can be used for the impregnation of pulverulent material such as wood flour which has been impregnated with the solutions sufmoulded by heat and pressure. It is possible to dry wood fluor which has been impregnated with the solutions sufficiently to enable it to be ground and used like the conventional moulding powders. When so dried and ground the material seems to retain sufficient solvent to keep the less acid salt in solution. The acidity necessary for further condensation to a thermo-hardened product is developed when the resulting moulding powder is moulded under heat and pressure.

It is known that if an amino-aldehyde condensation product in particulate form is produced in contact with fibres, yarns or fabrics, the particles are deposited thereon and adhere thereto producing an effect known as delustering. It is also known that if a condensation product of resinous character is produced within the fibres then useful effects are produced in textile fabrics so treated or textile fabrics made from the yarns or fibres so treated, these effects being in general improved dimensional stability, improved fastness of many dyestuffs and improved resistance to creasing. It is possible to produce these latter effects in combination with delustering. It is also known that to produce effects which have good washfastness, a final heating at a low pH is necessary.

It will be seen, therefore, that the solutions of the present invention in so far as they contain the ingredients of an amino-aldehyde condensation product are particularly suitable for the treatment of textile fibres, yarns or fabrics. For this purpose, the fibres, yarns or fabrics are impregnated with the solutions of the invention and are then dried and heated. During the drying the solutions are being concentrated by evaporation and a stage is reached at which separation of a less acid salt of a selected metal takes place resulting in an increase in the rate at which the pH falls. If the pH falls to a sufficiently low value to give rise to the precipitation of condensation product from the solutions while they are still in the interstices between the fibres of the textile material, then the condensation product will be deposited in particulate form on the fibres producing delustring. On further drying the solution remaining in the fibres themselves will be further concentrated by evaporation with further lowering of the pH enabling a final heating to be effected at a sufficiently low pH to form resinous condensation product of good fastness to washing. Such resinous condensation product, being formed within the fibres, gives the known useful effects hereinbefore referred to. The formation of the resinous condensation product also increases the fastness to washing of any delustre effect which may have been produced.

Accordingly, the invention includes a process of producing a finish on a textile material which comprises impregnating the textile material with a solution, especially an aqueous solution, of the present invention containing the ingredients of an amino-aldehyde condensation product and thereafter subjecting the impregnated material to drying and heating whereby to effect condensation of the resin-forming ingredients upon or within or upon and within the fibres of the textile material. Thus, the impregnated material may be first dried at a temperature below 100° C. and may thereafter be baked at a temperature above 100° C.

It is preferred to employ, as the ingredients of an amino-aldehyde condensation product, a crystalloidal intermediate condensation product of urea and formaldehyde or melamine and formaldehyde.

When textile yarns or fabrics of cellulosic material are impregnated with aqueous liquors, the fibres themselves will absorb about 25% to 40% of their weight of liquor, depending upon the nature of the fibres. Fibres of viscose rayon or mercerised cotton will absorb about 40% although fibres of unmercerised cotton or linen will absorb only about 25% to 30%. Aqueous liquor taken up by the yarns or fabrics in excess of that absorbed by the fibres will remain in the interstices between the fibres and is referred to herein as interstitial liquor. It is customary, in the treatment of cellulosic yarns or fabrics with aqueous liquors during textile finishing operations, to express the excess of liquor so that the yarns of fabrics retain a known predetermined quantity of liquor, generally 80% or 100% of their dry weight. It follows, therefore, that when yarns or fabrics of cellulosic materials are made to retain about 80–100% of their weight of aqueous liquor, from about one third to about one half of this will be interstitial liquor. It is this interstitial liquor which first disappears on drying. Accordingly, if the retained liquor can be concentrated by evaporation to such an extent that more than about 50% to 75% of the water is removed before any substantial amount of condensation product is precipitated then little or no delustring will take place. If, however, less than this amount of the water must be removed before condensation takes place then delustring will be brought about. Accordingly, in order to produce a delustred effect, the aqueous solution should be so composed that when the impregnated material is dried, the critical concentration (as hereinbefore defined) is exceeded before the weight of solution retained in and on the fibres of the textile material falls below 40% (and preferably before it falls below 60%) by weight based on the weight of dry unimpregnated textile material.

The ingredients of amino-aldehyde condensation products used in the solutions of the present invention may have as their amino component urea or melamine, for example, and as their aldehyde component formaldehyde or paraformaldehyde, for example. As already stated, the term "ingredients" includes partial condensates and one may therefore use in the solutions the water-soluble methylol compounds obtained by the condensation of urea or melamine with formaldehyde under alkaline conditions. The methylol ethers derived from urea and formaldehyde or melamine and formaldehyde may also be used; thus the dimethyl ether of dimethylol urea may be used. Such methylol ethers do not, however, give particulate precipitates suitable for delustring.

According to a modification of the process of producing a finish on a textile material, the solution is formed on and in the textile material, be effecting the impregnation in two stages. The first stage may comprise impregnating the textile material with a solution containing an acid salt, especially an alkali metal or ammonium acid salt, of said polybasic acid (such as the dihydrogen phosphate), the second stage then comprising impregnating the textile material with a solution containing the salt of a selected metal with an acid stronger than said polybasic acid, the textile material being dried between the stages. Either solution may contain the ingredients of the amino-aldehyde condensation product. Alternatively, the solution used for the first stage may contain the salt of a selected metal with an acid stronger than said polybasic acid and the solution used in the second stage the acid salt, especially an alkali metal or ammonium acid salt, of said polybasic acid (such as the dihydrogen phosphate). As before, either solution may contain the ingredients of the amino-aldehyde condensation product. In any of these alternatives, the composition of the solution used in the second stage must be so chosen that the desired precipitation of less acid salt does not take place upon impregnation but requires removal of solvent from and/or heating of the solution with which the fabric is so impregnated.

It is preferred to employ solutions which do not contain ammonium ions or ions of organic bases. Accordingly, if the solution is made with a metal salt of an acid stronger than said polybasic acid, it is (as already stated) preferred that the acid salt (such as the dihydrogen phosphate) employed be an alkali metal acid salt, especially an acid salt of sodium. Moreover, if the solution is buffered, it is preferred that ammonia or organic bases should not be used for this purpose. It is generally most convenient to employ the ingredients of the amino-aldehyde condensation product in the form of a water-soluble crystalloidal intermediate condensation product produced in known manner under neutral or alkaline conditions. It is preferred to employ such an intermediate condensation product for the preparation of the solutions of the present invention but it is preferred also to use one whose formation has not been catalysed by means of ammonia.

The solutions of the present invention containing the ingredients of amino-aldehyde condensation products possess a number of advantages over the solutions containing such ingredients hitherto employed which solutions depended for the development of acidity upon decomposition of an ammonium salt. Since removal of solvent is required to reduce the pH (except in a case such as that of magnesium dihydrogen phosphate where separation of a less acid salt will take place merely on heating to a transition temperature), such solutions of the present invention are quite stable even at temperatures above room temperature. Even in the case of magnesium dihydrogen phosphate acidity does not develop below 70° C. if the solution is not evaporated. The development of acidity by reaction of ammonium salts with aldehyde or intermediate condensation product gives rise to the production of volatile bases which are liable to have an unpleasant odour. Such volatile bases are not produced from those solutions of the present invention which do not contain ammonia or an ammonium salt. The use of ammonia and/or ammonium salts in the solutions causes the production of hexamine which adversely affects light-fastness of certain direct dyestuffs. Hexamine is not produced with those solutions of the present invention which do not contain ammonia or an ammonium salt. Solutions in which the development of acidity is caused by the reaction of ammonium salts are dependent for their effect upon the free formaldehyde content of the solutions. The development of acidity in the solutions of the present invention which do not contain ammonium salt is independent of the free formaldehyde content of the solutions. Even those solutions of the present invention which do contain ammonium salt undergo a development of acidity on removal of solvent and/or on heating which is independent of any acidity produced by the reaction of the ammonium salt with free formaldehyde in the solutions. The reaction of the ammonium salt in the known baths is an irreversible decomposition. As already stated the separation of less acid salt from the solutions of the present invention, and hence the change in pH from this cause, is reversible. This means that if such solutions after being concentrated by evaporation (or heated) are again diluted (or cooled, as the case may be) the separated salt is redissolved and the pH rises again. Accordingly, the pH can be reduced as required by removal of solvent from the solutions and can also be increased again by subsequent dilution. The effect of this is that when fibres, yarns or fabrics which have been impregnated with the solutions of the present invention are cured by baking at high temperatures, the acidity is high under the conditions of curing but on standing the moisture which is always absorbed by such materials from the atmosphere dissolves up the salts, giving rise to solutions of markedly higher pH.

A further advantage obtained with certain of the catalysts herein described, notably with magnesium dihydrogen phosphate or magnesium sulphate and sodium dihydrogen phosphate, is that the pH value obtained under the conditions of normal stenter drying is not sufficiently low to bring about appreciable resin fixation, which fixation it is desirable to avoid at this stage if the resin is to be insolubilised in the presence of a high proportion of superheated steam or if the impregnated fabric is to be calendered or embossed before resin insolubilisation.

Figure 5:
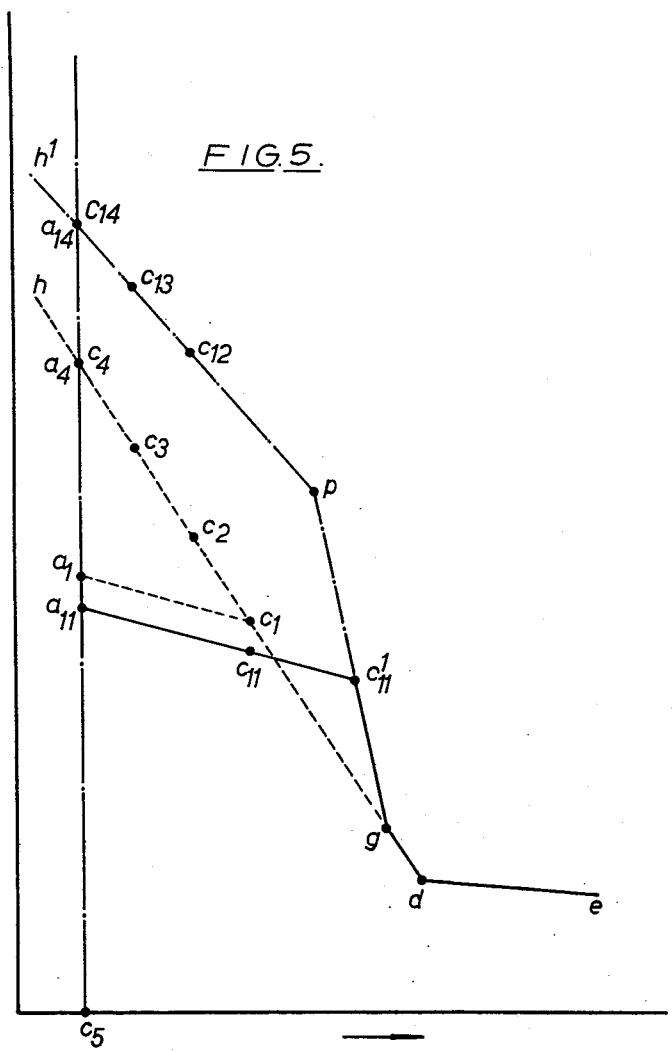
Figure 6:
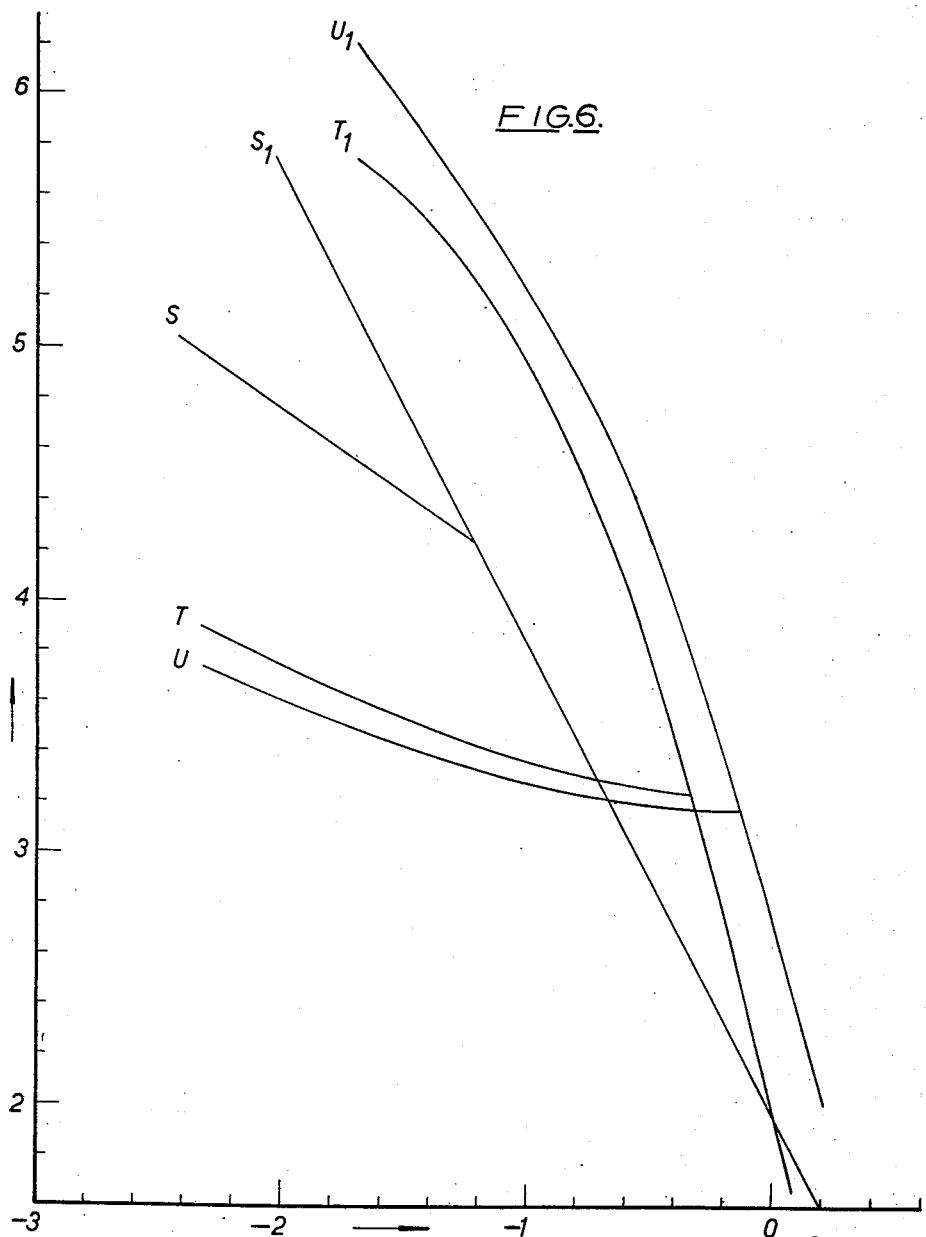

The invention will be further illustrated with reference to the accompanying drawings. In all the figures the pH is plotted as ordinate and the logarithm (to base 10) of the molar concentration as abscissa. FIGS. 1 to 4 are graphs showing idealized curves for the change in pH at room temperature with the logarithm of the molar concentration C of solutions of metal dihydrogen phosphates. FIG. 5 is a graph showing an idealized curve for the change in pH at room temperature with the logarithm of the molar concentration C of a solution of a dihydrogen phosphate of a selected metal, containing a complexing agent of the type hereinbefore described. FIG. 6 is a graph showing curves obtained at room temperature by experiment for the change in pH with the logarithm of the molar concentration C of aqueous solutions containing calcium dihydrogen phosphate in the absence and presence of the disodium salt of EDTA and/or a buffering agent. FIG. 7 is a graph showing curves obtained at room temperature by experiment for the change in pH with the logarithm of the molar concentration C of aqueous solutions of various metal dihydrogen phosphates. FIGS. 8 to 13 are a set of graphs showing curves obtained at room temperature by experiment for the change in pH with the logarithm of the molar concentration C of aqueous solutions of various metal acid salts.

Referring to FIG. 1 of the drawings, curve X represents in idealized form the change in pH with the logarithm of the molar concentration of a solution of the dihydrogen phosphate of a metal whose dihydrogen phosphate will first separate out on increasing the concentration of the solution by evaporation. The rate of change of pH (shown by the slope of the curve) remains substantially constant over the whole range of concentration until separation of the metal dihydrogen phosphate occurs after which no further change in concentration can take place (since the solution is saturated with the dihydrogen phosphate) and accordingly the pH itself remains constant. Curve Y represents in idealized form the change in pH with the logarithm of the molar concentration of a solution of the dihydrogen phosphate of a metal whose monohydrogen phosphate or trimetal phosphate will first separate out on increasing the concentration of the solution by evaporation, i.e. a "selected metal." It is at once apparent that the rate of change of pH does not remain constant over the whole range of concentrations but is at first at a comparatively low value. This initial rate of change, because it is determined substantially entirely by the rate of increase of hydrogen ion concentration due to removal of solvent, is practically the same as the rate of change represented by curve X. However, curve Y differs from curve X in that the rate of change of pH alters abruptly to a higher value and finally returns to another low value. The concentration $c$ at which this abrupt alteration in the rate of change of pH occurs is that which is termed herein the "critical concentration" and its value will depend on the metal cation of the selected metal dihydrogen phosphate used. The critical concentration will of course vary somewhat with temperature, the extent and direction of such variation again depending on the metal cation of the selected metal dihydrogen phosphate used.

This critical concentration is the point at which the selected metal monohydrogen or trimetal phosphate begins to separate. When this happens hydrogen ions are liberated and the pH of the solution thereafter depends on two factors—firstly on the rate at which hydrogen ions are liberated and secondly on the rate of increase of hydrogen ion concentration due to removal of solvent. For some time after the separation of the selected metal monohydrogen or trimetal phosphate begins, the major factor determining the rate of change of pH is the rate of liberation of hydrogen ions. As the amount of selected metal ions remaining in solution decreases however, a stage is reached when the liberation of hydrogen ions ceases to be the major factor in determining the rate of change of pH and this rate is determined primarily by the rate of increase of hydrogen ion concentration by removal of solvent. At this stage the rate of change of pH decreases as indicated by the change in slope of the curve at $d$. In practice, of course, this change would not be abrupt as shown but would be more gradual.

Figure 2:
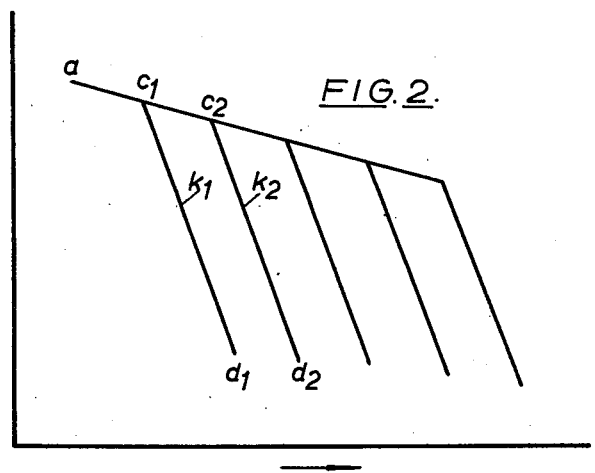

FIG. 2 is an idealized graph illustrating the dependency of the critical concentration on the nature of the selected metal. In this ideal form it is assumed that the pH of the solution at concentrations below the critical concentration is independent of the nature of the selected metal, so that the initial pH indicated by $a$ on the graph will be a constant for a given initial concentration. With a given selected metal $k_1$, having a low critical concentration (at $c_1$), increasing the concentration of the solution by evaporation gives a curve which follows the path $a$—$c_1$—$d_1$. If a selected metal $k_2$ whose critical concentration (at $c_2$) is higher is used, the curve follows the path $a$—$c_2$—$d_2$. Since the critical concentration is in fact the point at which the solution becomes saturated with respect to either the monohydrogen or the trimetal phosphate of the selected metal, the point at which the pH begins to fall rapidly is determined by the solubility of either the monohydrogen or tirmetal phosphate, of the selected metal. It is to be understood here that the term solubility refers to the solubility under the particular conditions prevailing in the solution and not to the absolute solubility in a pure solvent.

Figure 3:
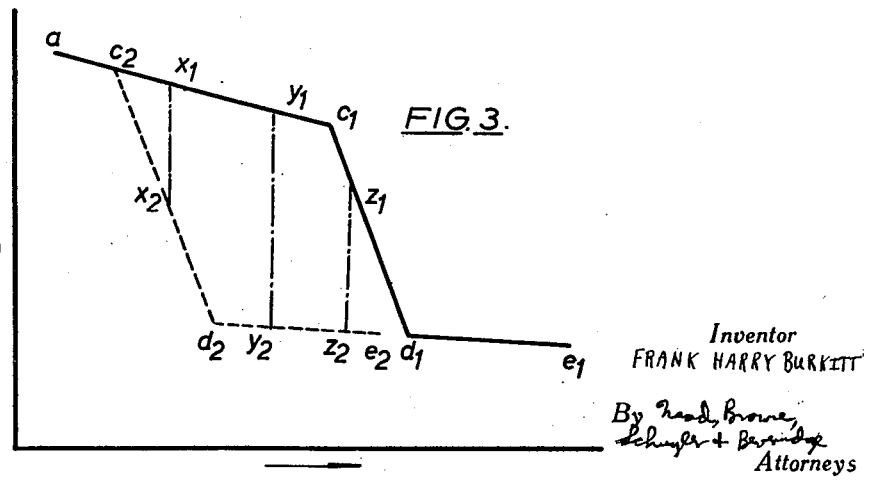

FIG. 3 illustrates the case where the salt which is first precipitated can exist in more than one form (e.g. hydrates) having different solubilities. In the case considered it is assumed that two forms exist, one $f_1$ stable below a temperature $t$ and the other $f_2$ stable above this temperature. It is also assumed that the form stable above $t$ has a lower solubility than the form stable below $t$. Increasing the concentration of the solution by evaporation gives, below $t$, a curve following the path $a$—$c_1$—$d_1$—$e_1$ and above $t$, following the path $a$—$c_2$—$d_2$—$e_2$. In form therefore, the two curves are similar to the graph shown in FIG. 2 the two forms being equivalent to two dihydrogen phosphates of different selected metals. The system considered here, however, is different from that of FIG. 2 in that it is possible to change over from one curve to the other without change of selected metal. Thus, if a solution of $f_1$ is made below $t$ and of a concentration below the critical concentration of $f_2$, e.g. at point $a$ on the graph and the solution is evaporated at a temperature below $t$ until the point $x_1$ is reached, and if then the temperaure is quickly raised above $t$, the critical concentration of $f_2$ will be exceeded and $f_2$ will separate until the solid precipitate is in equilibrium with the solution, i.e. at $x_2$ on curve $a$—$c_2$—$d_2$—$e_2$. On further evaporation of the solution keeping the temperature above $t$, the curve will then follow the path $x_2$—$d_2$—$e_2$. The change in the pH, $x_1$ to $x_2$ when $f_2$ separates under such a temperature increase is almost instantaneous and, since it is a phase change, will be independent of other constituents in the solution. The amount by which the pH drops without further evaporation on exceeding the temperature $t$ will depend on the amount by which the concentration of the solution exceeds the critical concentration of $f_2$. Thus, if the evaporation of the solution is continued to the point $y_1$, on curve $a$—$c_1$—$d_1$—$e_1$ before the temperature is caused to exceed $t$, then the pH will fall to a point $y_2$ between $d_2$ and $e_2$ on curve $a$—$c_2$—$d_2$—$e_2$. Since the drop in pH on evaporation of the solution between $d_2$ and $e_2$ is small relative to that which occurs between $c_2$ and $d_2$, or $y_1$ and $y_2$, the effect of increasing the temperature beyond $t$ is to produce almost the maximum possible drop in pH practically instantaneously. If the evaporation of the solution below $t$ is carried on until the point $z_1$ is reached on curve $a-c_1-d_1-e_1$, the critical concentration of $f_1$ will have been exceeded and the rate of change of pH will have already increased. Rapid increase of temperature beyond $t$ will then cause the pH to drop practically instantaneously to a point represented by $z_2$ on curve $a-c_2-d_2-e_2$, which thus has the effect of producing practically instantaneously the pH drop which would normally occur between $z_1$ and $d_1$ on further evaporation of the solution at a temperature below $t$.

It will be apparent that if the separation of $f_2$ upon removal of solvent is delayed by supersaturation, the effect will simply be that line $x_1$, $x_2$ is moved to the right and the almost instantaneous drop in pH, when it occurs, will be all the greater. If separation of the monohydrogen phosphate or trimetal phosphate of the selected metal illustrated in FIG. 2 upon removal of solvent is delayed by supersaturation, then the pH will undergo a sudden drop when separation does take place, undergoing a change similar to that shown by $a-x_1-x_2-d_2$ on FIG. 3.

Figure 4:
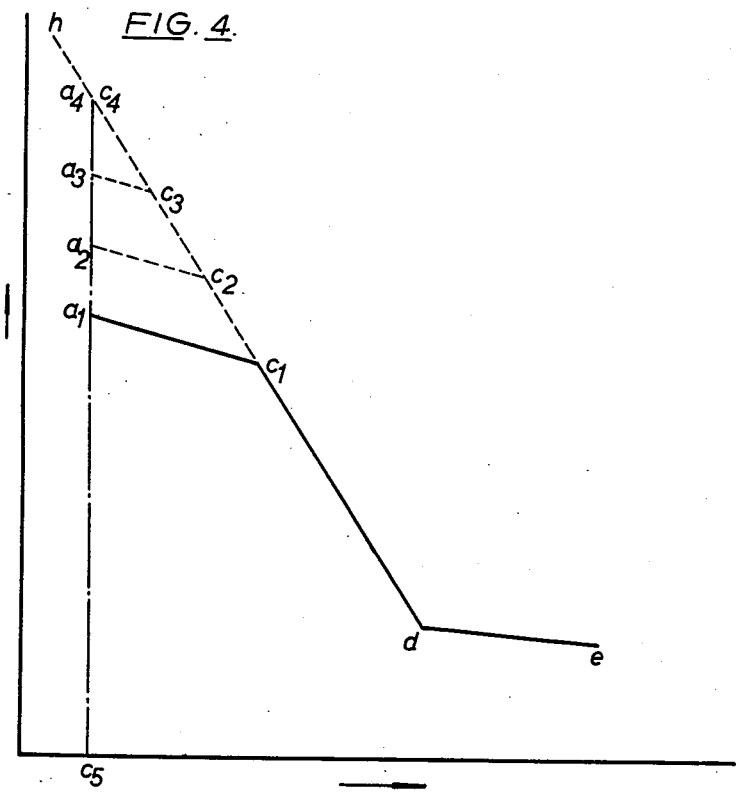

FIG. 4 illustrates the effect of different degrees of buffering on the change in pH which occurs when the concentration of a solution according to the present invention is increased by evaporation. Referring to the drawing, curve $a_1-c_1-d-e$ represents an idealized form the change in pH obtained on evaporating a solution, not containing a buffer, of the dihydrogen phosphate of a selected metal of initial concentration $c_5$. This curve is similar to that illustrated by curve Y of FIG. 1. If a buffering agent is added in an amount sufficient to raise the initial pH from the point $a_1$ to that at $a_2$ and the solution is then evaporated the curve follows the path $a_2-c_2-d-e$. Again, if the amount of buffering agent added is sufficient to raise the initial pH to the point represented by $a_3$, on evaporating the solution the curve will follow the path $a_3-c_3-d-e$. The critical concentrations (as hereinbefore defined) for these three curves are represented by the points $c_1$, $c_2$, and $c_3$, and it is seen from the graph that $c_3 < c_2 < c_1$. This relation is a characteristic property of the solutions of the present invention, i.e. that the addition of a buffering agent lowers the critical concentration. It is to be noted that these critical concentrations all lie on the extension of line $d-c_1$, of curve $a_1-c_1-d-e$. This means that the rate of change of pH with concentration, after the critical concentration has been reached, is unaffected by the buffering. In fact, the rate of change of pH before the critical concentration is reached is also unaffected by the buffering, as is shown by the parallel relation of lines $a_1-c_1$, $a_2-c_2$ and $a_3-c_3$, but this is of no importance. From the above relation it is to be expected that as the amount of buffering agent added is increased and the critical concentration consequently decreased, a stage will be reached when the critical concentration becomes equal to the initial concentration of the solution. Such a stage does, in fact, occur and is represented on the graph by the point $a_4$, $c_4$ which point lies at the intersection of the extension of line $c_5-a_1$ and the extension of line $d-c_1$. Since at the critical concentration, the solution is saturated with respect to the monohydrogen phosphate of the selected metal, any further addition of buffering agent will cause precipitation of this salt with a consequent lowering in the concentration of the ions of the selected metal and therefore also of dihydrogen phosphate of the selected metal in the solution. The change in pH with addition of buffering agent will then follow the curve $a_4-h$.

It is, of course, not desirable that the initial pH be raised beyond the point at which the critical concentration becomes equal to the initial concentration of the solution since this would lead to a loss of ions of the selected metal from the solution. The point $a_4$, $c_4$ thus represents the maximum pH to which it is desirable to buffer the solution. This maximum pH is however easily determinable by finding the point of intersection of the extensions of lines $c_5-a_1$ and $d-c_1$.

FIG. 5 illustrates the effect, on the curves illustrated in FIG. 4, of adding a complexing agent to the solution of a dihydrogen phosphate either without or with the addition of a buffering agent. Referring to FIG. 6 the curve $a_1-c_1-d-e$ and the extension $c_1-h$ of line $d-c_1$ of that curve corresponds to the idealized curve and extension reproduced in FIG. 4 and described above, the symbols used in FIG. 4 being retained in FIG. 5 for purposes of clarity. Curve $a_1-c_1-d-e$ therefore represents in idealized form the change in pH obtained on increasing the concentration of a solution, not containing a buffering agent, of the dihydrogen phosphate of a selected metal, and the extension $c_1-h$ of line $d-c_1$ of curve $a_1-c_1-d-e$ represents in idealized form the effect, on the critical concentration, of raising the pH by adding a buffering agent to the solution.

If a complexing agent is added to the solution, not containing a buffering agent, having a pH and a concentration corresponding to the point $a_1$ on the curve $a_1-c_1-d-e$, the immediate effect of such addition is to produce a lowering of the pH of the solution and the solution containing the complexing agent will have a pH corresponding to a point $a_{11}$ situated directly below the point $a_1$ on the graph, the concentration of the solution being substantially unaffected by the addition of the complexing agent. When such a solution containing a complexing agent is evaporated the change of pH follows the curve $a_{11}-c_{11}-g-d-e$. Initially the change in pH follows the line $a_{11}-c_{11}$ parallel to the line $a_1-c_1$ of curve $a_1-c_1-d-e$. At the point $c_{11}$ the concentration of the solution equals that for the point $c_1$ on curve $a_1-c_1-d-e$, which concentration is the critical concentration for the solution not containing a complexing agent or buffer. Further evaporation of the solution containing a complexing agent beyond point $c_{11}$ does not produce any precipitate or change in slope however until the point $c_{11}^1$ is reached. The addition of a complexing agent to the solution has thus increased the critical concentration of the solution from that corresponding to the point $c_{11}$ (i.e. that corresponding to point $c_1$) to that corresponding to the point $c_{11}^1$.

The slope of the curve, beyond the critical concentration corresponding to $c_{11}^1$ is greater than the slope of line $c_1-d$ of curve $a_1-c_1-d-e$ so that the curve for the solution containing a complexing agent meets the curve $a_1-c_1-d-e$ generally at a point such as $g$ on line $c_1-d$. On further concentration, the change of pH then follows the path $g-d-e$ on curve $a_1-c_1-d-e$.

The complexing agent used must be one which forms a complex with the selected metal which is stable at high pH but which progressively decomposes as the pH falls. As the concentration of a solution containing a complexing agent is increased by evaporation, the pH falls and some of the complex will decompose and release selected metal ions into the solution. Before the critical concentration is reached, the fall in pH is small and consequently only a small proportion of the complex will decompose. When the critical concentration is exceeded, however, the pH falls much more rapidly and much larger amounts of selected metal ions are released in the solution. Since the critical concentration has been passed, the solubility product for the monohydrogen phosphate is already exceeded and these released selected metal ions are immediately precipitated as monohydrogen phosphate and cause a further lowering of the pH over and above that already being produced by the continued increase in the concentration of the solution. This effect continues until virtually no complex remains in the solution and the rate of change of pH then reverts to that obtaining at the concentration achieved when no complexing agent is present in the solution. This behaviour is illustrated in FIG. 5 by the portion $c_{11}^1-g-d-e$ of the curve $c_{11}-c_{11}^1-g-d-e$.

If a buffering agent which raises the pH is added to a solution according to the present invention not containing a complexing agent, then the critical concentrations for various amounts of buffer added all lie on an extension $c_1$—$h$ of line $d$—$c_1$ as already described with reference to FIG. 4. If the solution contains a complexing agent the critical concentrations for various amounts of added buffer lie at first on the extension $c_{11}^1$—$p$ of line $g$—$c_{11}^1$ in FIG. 5. After the point $p$ has been reached, however, further additions of buffering agent result in the critical concentrations falling on a line $p$—$h^1$, of different slope to the line $c_{11}^1$—$p$.

Since the complexing agent is one which forms stable complexes at high pH, but which progressively decompose as the pH is lowered, as the pH is raised by the addition of a buffering agent, more and more of the complexing agent will combine to form a complex. The formation of the complex increases the critical concentration, whereas the addition of the buffer decreases the critical concentration and the result of these opposing forces is that the critical concentrations initially lie on the extension $c_{11}^1$—$p$ of line $g$—$c_{11}^1$. As the pH rises the complexing agent is progressively used up until no free complexing agent remains. After this point the only factor which modifies the critical concentration is the addition of buffer so that the amount by which the critical concentration is lowered for a given increase in pH is considerably increased and the slope of the extension changes. Since, however, a proportion of the metal ions are combined with the complexing agent, the system is not the same as that in absence of a complexing agent, and the slope of the line $p$—$h^1$ lies somewhere between that for the line $c_1$—$a_1$ and that for the line $c_1$—$h$. It will be seen from the graph, however, that for a given critical concentration, the pH to which the solution can be buffered is considerably higher when a complexing agent is present than when it is absent from the solution. Thus the points $c_{12}$, $c_{13}$ and $c_{14}$ on line $p$—$h^1$ correspond to points $c_2$, $c_3$ and $c_4$ on line $c_1$—$h$. The critical concentration is achieved when the product of the concentrations of the free selected metal ions and monohydrogen phosphate ions exceeds the solubility product of the selected metal monohydrogen phosphate. For a given concentration of monohydrogen phosphate ions therefore there is a limit to the amount of free selected metal ions which can exist in the solution without the critical concentration being exceeded. Now the amount of hydrogen ions which can be produced on evaporating the solution is dependent on the amount of selected metal (whether as free ions or as undissociated salt) which is initially present in the solution. The greater the initial content of selected metal the greater will be the amount of hydrogen ion produced. If the solubility product of the selected metal monohydrogen phosphate is small, then the amount of selected metal which can be present in the solution without exceeding the solubility product is also small. Consequently under these conditions only a small quantity of hydrogen ions can be produced by evaporating the solution, and there is a danger that stray traces of alkali present may neutralize the hydrogen ions formed to such an extent that the pH of the solution never becomes sufficiently low to effect satisfactory catalysis. If a complexing agent is added, however, the concentration of free selected metal ions is decreased. In order to bring the concentration of selected metal ions back to the value obtaining before addition of the complexing agent, a further amount of the requisite selected metal salt must be added to the solution, and consequently the amount of selected metal in the solution is increased whilst keeping the amount of selected metal ions substantially constant. By the addition of a complexing agent, therefore, the amount of selected metal initially present in the solution can be increased, and consequently the final amount of hydrogen ions produced by evaporating the solution can also be increased. By this means therefore the danger from traces of alkali present when the solubility product is small may be averted.

FIG. 6 is a graph showing curves obtained by experiment from the change in pH with the logarithm of the concentration C of aqueous solutions containing calcium dihydrogen phosphate in the absence and presence of EDTA and/or a buffering agent. Referring to FIG. 6, curves S, T and U represent the change in pH for solutions not containing a buffering agent but containing none, 10% and 40% respectively of the disodium salt of EDTA based on the total calcium content. Curves $S_1$, $T_1$ and $U_1$ are the modified forms of curves S, T and U respectively when a buffering agent is present in the solution.

FIG. 7 is a graph showing curves obtained at room temperature by experiment for the change in pH with the logarithm of the molar concentration C of aqueous solution of various metal dihydrogen phosphates. On the graph the curves are indicated by the chemical symbol of the selected metal concerned; thus Mg is the curve for magnesium dihydrogen phosphate $[Mg(H_2PO_4)_2]$. Where a selected metal can have more than one acid dihydrogen phosphate accordnig to its valency state the particular valency state is indicated by positive charges, thus Ferrous is written as $Fe^{++}$. For comparison, the curves for sodium dihydrogen phosphate (indicated by the chemical symbol Na) and for orthophosphate (indicated by the chemical formula $H_2PO_4$) are also shown.

Figure 9:
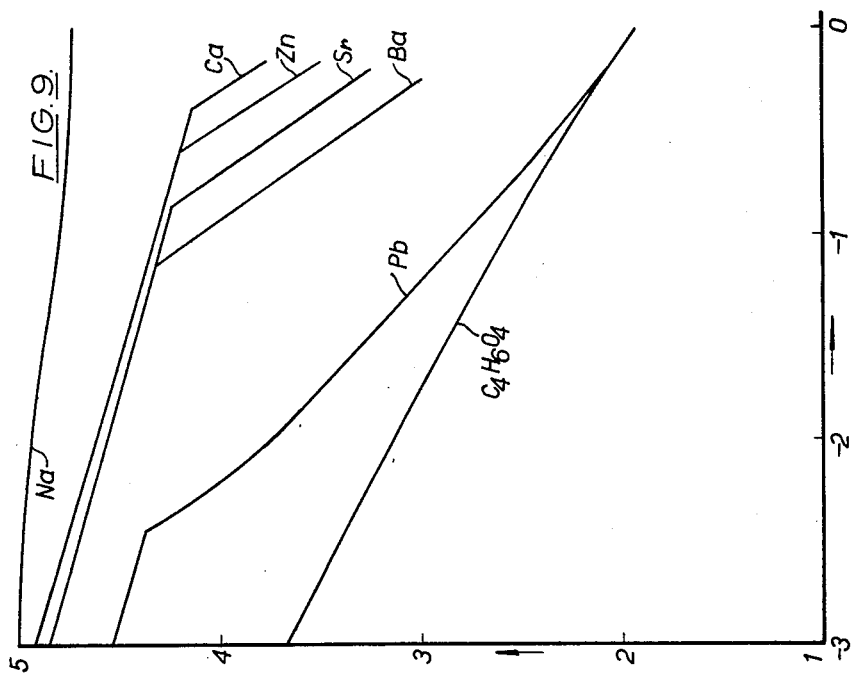
Figure 8:
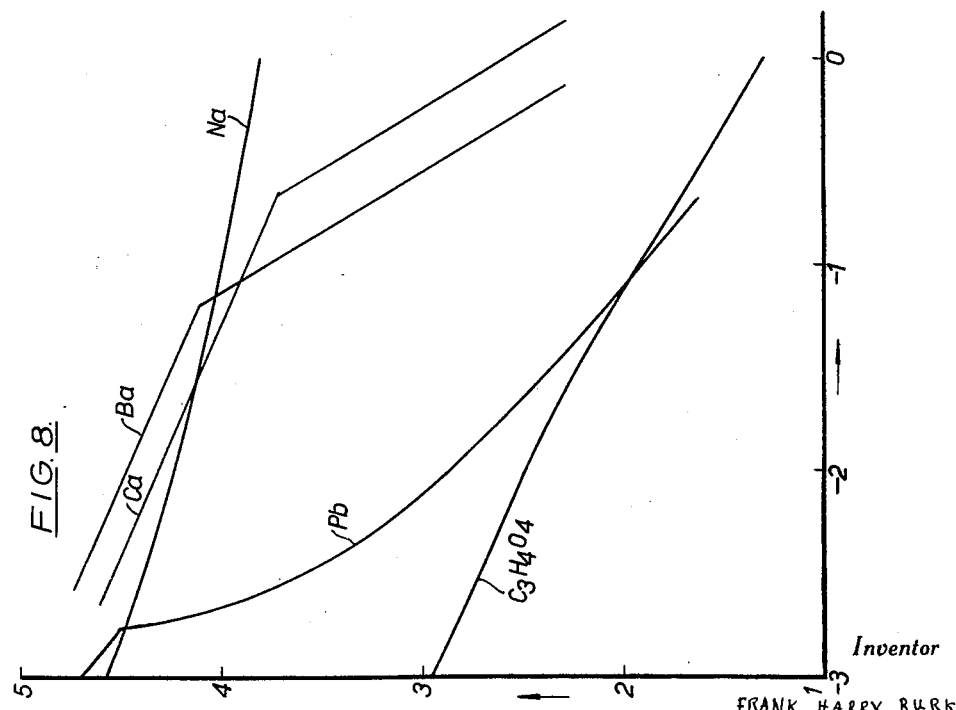
Figure 13:
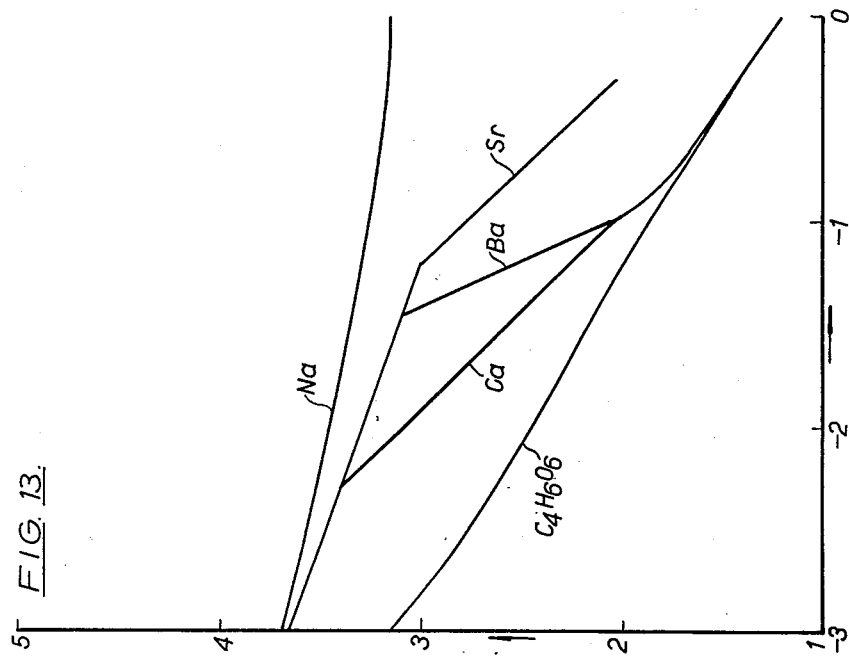
Figure 12:
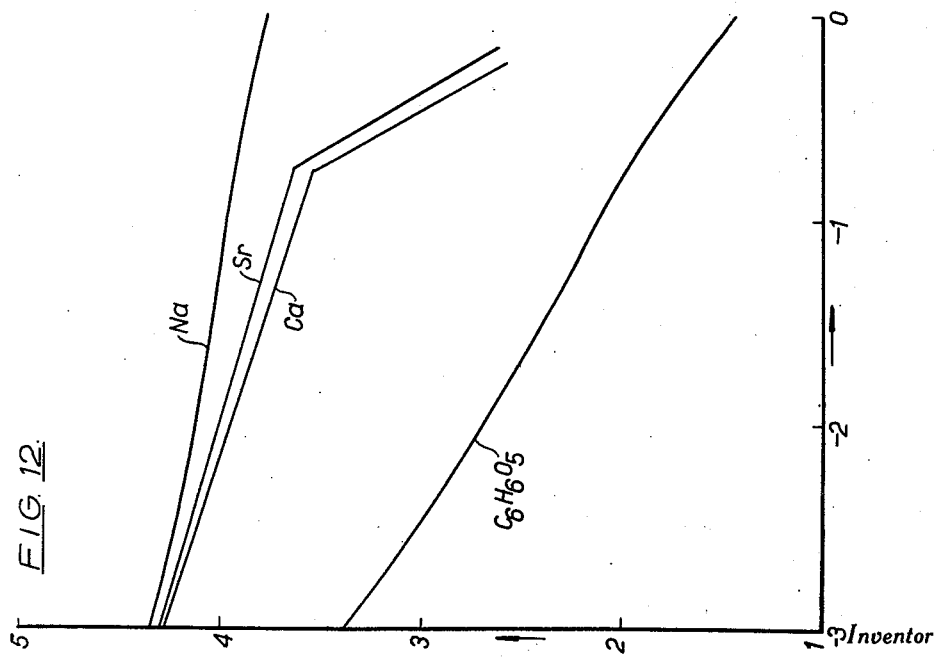

FIGS. 8–13 are graphs similar to that of FIG. 7 showing curves obtained at room temperature by experiment for a change in pH with the lorgarithm of the molar concentration C of aqueous solutions of various other metal acid salts. The particular systems illustrated are as follows:

FIGURE 8. Hydrogen malonate systems.
FIGURE 9. Hydrogen succinate systems.
FIGURE 10. Di-hydrogen citrate systems.
FIGURE 11. Hydrogen maleate systems.
FIGURE 12. Hydrogen malate systems.
FIGURE 13. Hydrogen tartrate systems.

In each case the curves are indicated by the chemical symbol of the selected metal concerned. For comparison curves for the sodium acid salt and for the free acid are also shown in all the figures. The curves for the sodium salts are indicated in each case by the chemical symbol Na and the curves for the free acid are indicated by the empirical formula for the particular acid concerned, i.e.:

FIGURE 8. $C_3H_4O_4$ malonic acid.
FIGURE 9. $C_4H_6O_4$ succinic acid.
FIGURE 10. $C_6H_8O_7H_2O$ citric acid.
FIGURE 11. $C_4H_4O_4$ maleic acid.
FIGURE 12. $C_6H_6O_5$ malic acid.
FIGURE 13. $C_4H_6O_6$ tartaric acid.

It is known from our British patent specification No. 467,480 that fabrics and other textile materials can be delustred and/or weighted by precipitating thereon an insoluble non-resinous condensation product in the form of finely divided particles from urea or urea-like substances and formaldehyde or from soluble partial condensates thereof used for impregnating the material, by the addition of an acid or a substance liberating an acid before, during or after impregnation so that the precipitate is formed directly on the textile material. The precipitant used in that process is preferably an acid and the textile material may be impregnated with any two of the three components of the reaction and then treated with the third or may be impregnated with any one of the three components and then treated with the other two. Insoluble condensation products of urea and formaldehyde in the form of white, amorphous discrete particles (known as methylene ureas) are excellent delustrants and are capable of being formed by precipitation at ordinary temperature. If heat is used at all in their preparation, it is necessary carefully to avoid either an unduly high temperature or an excessive time of heating, otherwise synthetic resin formation will take place. Although the precipitant is an acid, the urea-formaldehyde mixture may contain a potential precipitant (i.e. one capable of liberating the acid precipitant under the conditions of treatment) e.g. the ammonium salt of an acid, which acid will then be liberated on warming or treating the impregnated material with wet steam, provided that resin-formation is avoided.

Delustring is quite easily accomplished with the aid of aqueous solutions containing the ingredients of amino aldehyde condensation products according to the present invention, by simply impregnating a textile fabric with a solution whose composition is so chosen that the precipitation of condensation product takes place on mere heating or on evaporation before more than a minor proportion of the water has been removed, and then drying the fabric and/or heating it to bring about such precipitation. After such precipitation the dried fabric may be further heated, for example to a temperature above 100° C., to form insoluble resinous condensation products from any remaining resin-forming ingredients.

One advantage of using the solutions of the present invention for delustring textile materials, is that the delustring effect and the quantity of particulate precipitate which is formed can be more easily controlled than in the known process. Another advantage is that it is more easy, with the solutions of the present invention, to combine the delustring with improvement in the properties of the textile materials, such as improved resistance to creasing, consequent upon the formation of resinous condensation product within the fibres.

It has been found that when textile materials are delustred with the solutions of the present invention, some of the salt of the selected metal which was precipitated on removal of solvent from and/or heating of the solution is associated with the condensation product whose particles are deposited on the textile material. If the textile material is treated with a sequestering agent, as may happen in laundering, the selected metal can be removed and this removal may be accompanied by removal of some or all of the particulate condensation product.

This disadvantage can be reduced by using a selected metal which is not removed by sequestering agents likely to be applied to the textile material. Thus calcium salts are less suitable than barium salts since calcium is more effectively sequestered than barium by sodium hexametaphosphate, a compound which is contained in certain commercial detergent preparations. The disadvantage can also be minimised or even avoided by ensuring that the solution contained in the fabric, after deposition of the condensation product in particulate form, still contains resin-forming ingredients and by heating the textile material after drying to a sufficiently high temperature to form resinous condensation products from such ingredients. By doing this, there may also be conferred upon the fabric the known improvements in properties consequent upon formation of synthetic resin therein, such as improved resistance to creasing.

It is possible to produce delustred patterns on a lustrous background or lustrous patterns on a delustred background by the use of solutions of the present invention. This can be done by printing a fabric with a printing paste containing alkali, for example caustic soda, sodium carbonate or potassium carbonate and the usual other components necessary for successful printing, together with a dyestuff if desired, drying, steaming if any dyestuff is used which requires this, and drying again if necessary, before impregnating with the appropriate solution of the invention. The printed areas resist delustring.

Where the solutions of the present invention containing the ingredients of amino aldehyde condensation products are employed for the treatment of textile materials to deposit resinous condensation product in the fibres thereof, for the production of effects such as resistance to creasing, it is necessary to use solutions from which the less acid salt of the selected metal will not be deposited until a major proportion of the ionizing solvent has been removed. Such solutions are used in the same way as the customary acid-catalysed solutions of the ingredients of an amino-formaldehyde resin. The textile material is impregnated with the solution, dried at a temperature below 100° C. and the dried fabric heated for a short time, say 2 to 6 minutes at a temperature above 100° C., say 120°–180° C. A solution of a crystalloidal condensation product such as is normally used for this type of process may first be prepared and there may then be dissolved in it the necessary salts, such as sodium dihydrogen phosphate, and either calcium chloride or magnesium chloride, to make a solution according to the present invention.

The invention will be further illustrated by reference to the following examples:

*Example 1.—Production of crease resistance. Use of complexing agent*

A urea-formaldehyde precondensate solution was prepared as follows:

1445 cc. neutral aqueous 40% formaldehyde
720 g. urea and
20 g. borax were mixed together and allowed to stand overnight. The following morning, the precipitated methylol ureas were redissolved by the addition of an equal volume of warm water.

An impregnating solution was prepared by mixing together:

30 cc. of a precondensate prepared as above,
5 cc. of a molar aqueous solution of strontium chloride (approximately 26.7% w./v. solution of $SrCl_2.6H_2O$),
5 cc. of a molar aqueous solution of sodium dihydrogen phosphate (approximately 16.5% w./v. solution of $NaH_2PO_4.2H_2O$),
3 cc. of a half-molar aqueous solution of the disodium salt of cyclohexylene diamine tetra-acetic acid (approximately 19.5% w./v. solution of $C_{14}H_{20}O_2N_2Na_2$).
Water to make up 100 cc.

A spun viscose rayon fabric was then immersed in this impregnating solution, passed through a mangle adjusted to leave 100% (calculated on the dry weight of fabric) of the solution on the fabric, and dried at 60° C. The dried fabric was heated for 3 minutes at 140° C., washed in an aqueous solution of 0.25% soap and 0.25% soda ash, rinsed in water, squeezed and dried. The resultant fabric possessed good crease resistance and good resin washfastness.

*Example 2.—Production of crease-resistance. Use of complexing agent.*

An impregnating solution was prepared by mixing together:

30 cc. of a precondensate as in Example 1.
10 cc. of a molar aqueous solution of calcium chloride (approximately 21.9% w./v. solution of $CaCl_2 \cdot 6H_2O$).
10 cc. of a molar aqueous solution of sodium dihydrogen phosphate (approximately 15.6% w./v. solution of $NaH_2PO_4 \cdot 2H_2O$),
22 cc. of a half-molar aqueous solution of the magnesium disodium salt of ethylene diamine tetra-acetic acid (approximately 17.9% w./v. solution of $$C_{10}H_{12}O_8N_2MgNa_2$$

Water to make up 100 cc.

A spun viscose rayon fabric was then immersed in this impregnating solution and treated in the manner described in Example 1. The resultant fabric possessed good crease resistance and good resin washfastness.

Example 3.—Production of crease resistance. Use of complexing agent effecting cure at 100° C.

An impregnating solution was prepared by mixing together:

30 cc. of a precondensate prepared as in Example 1.
5 cc. of a molar aqueous solution of calcium chloride (approximately 21.9% w./v. solution of $CaCl_2 \cdot 6H_2O$),
5 cc. of a molar aqueous solution of sodium dihydrogen phosphate (approximately 15.6% w./v. solution of $NaH_2PO_4 \cdot 2H_2O$),
8 cc. of a quarter-molar aqueous solution of the disodium salt of ethylene diamine tetra-acetic acid (approximately 9.3% w./v. solution of $C_{10}H_{14}O_8N_2Na_2 \cdot 2H_2O$),
Water to make up 100 cc.

A spun viscose rayon fabric was then immersed in this impregnating solution and treated in the manner described in Example 1, except that curing was carried out for 3 minutes at 100° C. instead of 3 minutes at 140° C. The resultant fabric possessed good crease resistance and good resin washfastness.

Example 4.—Production of crease-resistance. Use of complexing agent

A urea-formaldehyde precondensate was prepared as follows:

100 gms. of urea were dissolved in 200 ccs. of neutral 40% aqueous formaldehyde solution and 9 cc. of ammonia solution (S.G.O. 88) were added. This solution was refluxed for three minutes and then cooled rapidly.

An impregnating solution was prepared by mixing together:

60 cc. of the above precondensate solution,
10 cc. of a molar aqueous solution of calcium chloride (approximately 21.9% w./v. of $CaCl_2 \cdot 6H_2O$),
10 cc. of a molar aqueous solution of sodium dihydrogen phosphate (approximately 15.5% w./v. of $NaH_2PO_4 \cdot 2H_2O$)
4 ccs. of a molar aqueous solution of disodium hydrogen nitrilotriacetate (approximately 26.7% w./v. of $C_6H_7O_6NNa_2$).

A spun viscose rayon fabric was immersed in this impregnating solution, passed through a mangle adjusted to leave 110% (calculated on the dry weight of the fabric) of the solution on the fabric, and dried at 60° C. The dried fabric was heated for 3 minutes at 140° C., washed in an aqueous solution of 0.25% soap and 0.25% soda ash, rinsed, squeezed and dried. The resulting fabric possessed good crease-resistance and good resin washfastness.

I claim:

1. A solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when said solvent is removed from the solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

2. A solution in an ionizing solvent of the ingredients of an aldehyde resin, whose formation is catalysed by acid, containing in solution, a dihydrogen orthophosphate of a metal selected from the group consisting of lithium, barium, calcium, strontium, magnesium, zinc, copper, ferrous iron, manganese, cadmium, and cobalt whose monohydrogen orthophosphate will be precipitated before said dihydrogen orthophosphate when said solvent is removed from said solution, and a complexing agent selected from the group consisting of ethylene diamine tetraacetic acid, alkali metal salts of ethylene diamine tetraacetic acid, nitrilo triacetic acid and alkali metal salts of nitrilo triacetic acid, cyclo hexylene diamine tetraacetic acid and alkali metal salts of cyclo hexylene diamine tetraacetic acid.

3. An aqueous solution of the ingredients of an aldehyde resin, whose formation is catalysed by acid, containing in solution a dihydrogen salt of orthophosphoric acid with a metal selected from the group consisting of lithium, barium, calcium, strontium, magnesium, zinc, copper, ferrous iron, manganese, cadmium and cobalt, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

4. A solution in an ionizing solvent of the ingredients of an aldehyde resin selected from the group consisting of urea-formaldehyde, melamine-formaldehyde, and phenol-formaldehyde resins, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when said solvent is removed from said solution and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

5. An aqueous solution of the ingredients of an amino-aldehyde resin, whose formation is catalysed by acid, containing in solution a dihydrogen orthophosphate of a metal selected from the group consisting of lithium, barium, calcium, strontium, magnesium, zinc, copper, ferrous iron, maganese, cadmium, and cobalt whose monohydrogen orthophosphate will be precipitated before the said dihydrogen orthophosphate when water is removed from said aqueous solution, together with a buffering agent selected from the group consisting of ammonia, organic bases, alkali metal hydroxides and alkali metal salts of acids weaker than orthophosphoric acid, and together with a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

6. A solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic maleic, tartaric and succinic acids having a first dissociation constant in water of at least $10^{-6}$, selected from the group consisting of the alkali metal and ammonium acid salts of said polybasic acid, and also a salt with an acid stronger than said polybasic acid of a metal selected from the group consisting of lithium, barium, calcium, strontium, magnesium, zinc, copper, ferrous iron, manganese, cadmium, and cobalt of which a less acid salt with said polybasic acid will separate from the solution before the acid salt of said metal with said polybasic acid when said solvent is removed from said solution and containing also a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

7. A solution in an ionizing solvent of the ingredients of an aldehyde resin, whose formation is catalysed by acid, containing in solution an acid salt of orthophosphoric acid, selected from the group consisting of the alkali metal and ammonium dihydrogen orthophosphates, and also a salt with an acid stronger than orthophosphoric acid of a metal selected from the group consisting of lithium, barium, calcium, strontium, magnesium, zinc, copper, ferrous iron, manganese, cadmium, and cobalt whose monohydrogen orthophosphate will be precipitated before its dihydrogen orthophosphate when said solvent is removed from said solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

8. An aqueous solution of the ingredients of an amino-aldehyde resin, whose formation is catalysed by acid, containing in solution an acid salt of orthophosphoric acid, selected from the group consisting of the ammonium and alkali metal dihydrogen orthophosphates, and also a salt with an acid stronger than orthophosphoric acid of a metal selected from the group consisting of lithium, barium, calcium, strontium, magnesium, zinc, copper, ferrous iron, manganese, cadmium and cobalt, and a complexing agent selected from the group consisting of ethylene diamine tetraacetic acid, alkali metal salts of ethylene diamine tetraacetic acid, nitrilo triacetic acid, alkali metal salts of nitrilo triacetic acid and cyclo hexylene diamine tetraacetic acid, and alkali metal salts of cyclo hexylene diamine tetraacetic acid.

9. A solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, selected from the group consisting of the alkali metal and ammonium salts of said polybasic acid, and also a salt with an acid stronger than said polybasic acid of a metal of which a less acid salt with said polybasic acid will separate from the solution before the acid salt of said metal with said polybasic acid when said solvent is removed from said solution, together with a buffering agent which reduces the hydrogen ion concentration in said solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

10. An aqueous solution of the ingredients of an amino aldehyde resin, whose formation is catalysed by acid, containing in solution an acid salt of orthophosphoric acid, selected from the group consisting of the ammonium and alkali metal dihydrogen orthophosphates, and also a salt with an acid stronger than orthophosphoric acid of a metal selected from the group consisting of lithium, barium, calcium, strontium, magnesium, zinc, copper, ferrous iron, manganese, cadmium, and cobalt whose monohydrogen orthophosphate will be precipitated before the dihydrogen orthophosphate thereof when water is removed from said solution, together with a buffering agent selected from the group consisting of ammonia, organic bases, alkali metal hydroxides and alkali metal salts of acids weaker than orthophosphoric acid and together with a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid.

11. A process which comprises impregnating a fibrous material with a solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when water is removed from the solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid, and thereafter evaporating water from and heating the impregnated material whereby to effect condensation of the resin-forming ingredients.

12. A process which comprises impregnating a fibrous material with an aqueous solution of the ingredients of an aldehyde resin, whose formation is catalysed by acid, containing in solution a dihydrogen orthophosphate of a metal selected from the group consisting of lithium, barium, calcium, strontium, magnesium, zinc, copper, ferrous iron, manganese, cadmium, and cobalt whose monohydrogen orthophosphate will be precipitated before said dihydrogen orthophosphate when water is removed from said solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid, and thereafter evaporating water from and heating the impregnated material whereby to effect condensation of the resin-forming ingredients.

13. A process which comprises impregnating a fibrous material with a solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when said solvent is removed from said solution, together with a buffering agent which reduces the hydrogen ion concentration in said solution and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid, and thereafter evaporating water from and heating the impregnated material whereby to effect condensation of the resin-forming ingredients.

14. A process which comprises impregnating a fibrous material with an aqueous solution of the ingredients of an amino-aldehyde resin, whose formation is catalysed by acid, containing in solution a dihydrogen orthophosphate of a metal selected from the group consisting of lithium, barium, calcium, strontium, magnesium, zinc, copper, ferrous iron, manganese, cadmium, and cobalt whose monohydrogen orthophosphate will be precipitated before the said dihydrogen orthophosphate when water is removed from said aqueous solution, together with a buffering agent selected from the group consisting of ammonia, organic bases, alkali metal hydroxides and alkali metal salts of acids weaker than orthophosphoric acid, and together with a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid and thereafter evaporating water from and heating the impregnated material whereby to effect condensation of the resin-forming ingredients.

15. A process which comprises impregnating a fibrous material with a solution in an ionizing solvent of the ingredients of an aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, selected from the group consisting of the alkali metal and ammonium acid salts of said polybasic acid, and also a salt with an acid stronger than said polybasic acid of a metal selected from the group consisting of lithium, barium, calcium, strontium, magnesium, zinc, copper, ferrous iron, manganese, cadmium, and cobalt of which a less acid salt with said polybasic acid will separate from the solution before the acid salt of said metal with said polybasic acid when said solvent is removed from said solution and together with a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid and thereafter evaporating water from and heating the impregnated material whereby to effect condensation of the resin-forming ingredients.

16. A process which comprises impregnating a fibrous material with an aqueous solution of the ingredients of an amino-aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, selected from the group consisting of the alkali metal and ammonium acid salts of said polybasic acid, and also a salt with an acid stronger than said polybasic acid of a metal selected from the group consisting of lithium, barium, calcium, strontium, magnesium, zinc, copper, ferrous iron, manganese, cadmium, and cobalt of which a less acid salt with said polybasic acid will separate from the solution before the acid salt of the said metal with the said polybasic acid when water is removed from said solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid, and thereafter evaporating water from and heating the impregnated material whereby to effect condensation of the resin forming ingredients.

17. A process for producing a finish on a textile material which comprises impregnating said textile material with an aqueous solution of the ingredients of an amino-aldehyde resin, whose formation is catalysed by acid, containing in solution an acid salt of a polybasic acid selected from the group consisting of phosphoric, phosphorous, pyrophosphoric, malonic, malic, maleic, tartaric and succinic acids having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when water is removed from said aqueous solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamino tetraacetic acid and alkali metal salts of cyclo hexylene diamine tetraacetic acid, evaporating water from and heating the impregnated material, said solution being so composed that when water is evaporated from said impregnated material, said less acid salt is precipitated before the weight of said solution retained in and on the fibres of said textile material falls below 40% by weight, based on the weight of dry unimpregnated textile material, whereby to effect condensation of the resin-forming ingredients upon the fibres of said textile material.

18. A process for producing a finish on a textile material which comprises impregnating said textile material with an aqueous solution of the ingredients of an amino-aldehyde resin selected from the group consisting of urea-formaldehyde, melamine-formaldehyde, and phenol formaldehyde, whose formation is catalysed by acid, containing in solution an acid salt of a polybasic acid selected from the group consisting of phosphoric, phosphorous, pyrophosphoric, malonic, malic, maleic, tartaric and succinic acids, having a first dissociation constant in water of at least $10^{-6}$, with a metal selected from the group consisting of lithium, barium, calcium, strontium, magnesium, zinc, copper, ferrous iron, manganese, cadmium, and cobalt of which a less acid salt with the same polybasic acid will be precipitated before said acid salt when water is removed from said aqueous solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid and alkali metal salts of cyclo hexylene diamine tetraacetic acid, thereafter evaporating water from and heating the impregnated material, said solution being so composed that when water is so evaporated from said impregnated material, said less acid salt is precipitated therefrom only after the weight of said solution retained in and on the fibres of said textile material falls below 40% by weight based on the weight of dry unimpregnated textile material, whereby to effect condensation of the resin-forming ingredients within the fibres of said textile material.

19. A process for producing a finish on a textile material which comprises impregnating said textile material with an aqueous solution of the ingredients of an amino-aldehyde resin, whose formation is catalysed by acid, containing in solution an acid salt of orthophosphoric acid selected from the group consisting of the ammonium and alkali metal dihydrogen orthophosphates, and also a salt with an acid stronger than orthophosphoric acid of a metal selected from the group consisting of lithium, barium, calcium, strontium, magnesium, zinc, copper, ferrous iron, manganese, cadmium, and cobalt whose monohydrogen orthophosphate will be precipitated before the dihydrogen orthophosphate thereof when water is removed from said solution, and a complexing agent selected from the group consisting of ethylene diamine tetraacetic acid, alkali metal salts of ethylene diamine tetraacetic acid, nitrilo triacetic acid, alkali metal salts of nitrilo triacetic acid, cyclo hexylene diamine tetraacetic acid, and alkali metal salts of cyclo hexylene diamine tetraacetic acid, and thereafter evaporating water from and heating the impregnated material, said solution being so composed that when water is so evaporated from said impregnated material, said monohydrogen orthophosphate is precipitated therefrom only after the weight of said solution retained in and on the fibres of said textile material falls below 40% by weight based on the weight of dry unimpregnated textile material, whereby to effect condensation of the resin-forming ingredients within the fibres of said textile material.

20. A process for producing a finish on a textile material which comprises impregnating said textile material with an aqueous solution of the ingredients of an aminoaldehyde resin, whose formation is catalysed by acid, containing in solution an acid salt of orthophosphoric acid selected from the group consisting of the ammonium and alkali metal dihydrogen orthophosphates, and also a salt with an acid stronger than orthophosphoric acid of a metal whose monohydrogen orthophosphate will be precipitated before the dihydrogen orthophosphate thereof when water is removed from said solution, and the disodium salt of ethylene diamine tetraacetic acid as a complexing agent, and thereafter evaporating water from and heating the impregnated material, said solution being so composed that when water is so evaporated from said impregnated material, said monohydrogen orthophosphate is precipitated therefrom before the weight of said solution retained in and on the fibres of said textile material falls below 40% by weight based on the weight of dry unimpregnated textile material, whereby to effect condensation of the resin forming ingredients within the fibres of said textile material.

References Cited in the file of this patent

UNITED STATES PATENTS

| | | |
|---|---|---|
| 2,267,276 | Hager | Dec. 23, 1941 |
| 2,311,027 | Burke | Feb. 16, 1943 |
| 2,348,244 | Dearing | May 9, 1944 |
| 2,582,961 | Burnell et al. | Jan. 22, 1952 |
| 2,646,340 | Nikerson | July 21, 1953 |
| 2,662,071 | Egon | Dec. 8, 1953 |
| 2,670,341 | Joffe | Feb. 23, 1954 |
| 2,681,326 | Christianson | June 15, 1954 |
| 2,684,347 | Nickerson | July 20, 1954 |
| 2,711,998 | Weaver et al. | June 28, 1955 |

FOREIGN PATENTS

| | | |
|---|---|---|
| 517,317 | Canada | Oct. 11, 1955 |
| 661,952 | Great Britain | Nov. 28, 1951 |

OTHER REFERENCES

Sequestrene, Geigy Industrial Chemicals, Ardsley, N.Y., 1952, pages 44–50.